Nov. 29, 1955 E. H. HUGENHOLTZ 2,725,476

PHASE STABILISING DEVICE

Filed May 9, 1951

INVENTOR
EDUARD HERMAN HUGENHOLTZ

BY Fred M Vogel

AGENT

United States Patent Office 2,725,476
Patented Nov. 29, 1955

2,725,476

PHASE STABILISING DEVICE

Eduard Herman Hugenholtz, Hilversum, Netherlands, assignor to Hartford National Bank and Trust Company, Hartford, Conn., as trustee Application May 9, 1951, Serial No. 225,417

Claims priority, application Netherlands May 22, 1950

5 Claims. (Cl. 250—36)

This invention relates to an arrangement for stabilising the phase and frequency of a first voltage produced by a variable oscillator within a predetermined catching range with respect to a second voltage produced by a reference oscillator, said arrangement comprising a reactance tube which controls the phase and frequency of the first voltage by properly acting upon the tank circuit of said variable oscillator, said tube having supplied to it via a filter a control voltage which is obtained by mixing the first and second oscillator voltage and which, when with stabilisation occurs (i. e., isochronism of the first and second oscillator voltages), is constituted essentially by a direct voltage and otherwise by an alternating voltage. The addition in such an arrangement of a search voltage generator which, when said first voltage falls outside of said catching range, produces a search voltage which is supplied to the reactance tube, has the effect of extending said catching range.

The invention has for its object to provide a particularly simple form of an arrangement of the kind described above.

According to the invention, the search voltage generator comprises a glow discharge tube whose energizing voltage is derived from the anode circuit of the reactance tube so that the search voltage generator only oscillates when an excessive current flows in said tube.

In order that the invention and its advantages may be clearly understood and the invention may be readily carried into effect, three embodiments of the invention will now be described more fully with reference to the accompanying drawing, similar elements being designated in the figures by like reference numerals.

Figure 1:
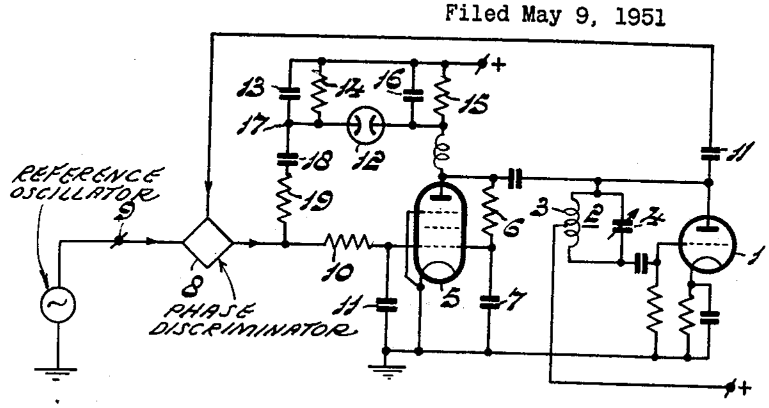
Fig. 1 shows a circuit arrangement of a device according to the invention comprising a separate oscillator and, connected in parallel with the frequency-determining circuit thereof, a reactance tube.

Referring to Fig. 1, 1 designates a triode connected as an oscillator which has a frequency-determining resonance circuit 2 connected between the anode and the control grid, said circuit including a circuit coil 3 and a tuning condenser 4. The cathode is grounded through a cathode resistance shunted by a condenser and a tap of the circuit coil 3 is connected to the anode voltage source.

Coupled to the frequency-determining circuit 2 of the oscillator 1—4 is a frequency corrector pentode tube 5 connected as a reactance tube. The anode of the tube is capacitively coupled to that end of the frequency-determining circuit 2 of the oscillator which is adjacent to the anode of the tube 1. The cathode of tube 5 is grounded.

The reactance tube 5 is coupled back in a well-known and wattless manner via a phase shifting network comprising a resistor 6 included between the anode and the grid and a condenser 7 connected between the grid and the cathode. Such a tube circuit arrangement behaves as a reactance, the value of which is controlled by a first control voltage supplied to its control grid.

The first control voltage is obtained from the output of a phase discriminator 8. It is produced by mixing a second control voltage applied at terminal 9 with a voltage obtained via condenser 11 from the oscillator tube 1. The first control voltage when the oscillator- and second control voltage are in isochronism is constituted essentially by a direct voltage and if isochronism does not occur by an alternating voltage of difference-frequency. It is supplied to the control grid of the reactance tube via a low-pass filter comprising a resistor 10 and a grounded output condenser 11.

The circuit arrangement hitherto described is a circuit arrangement of the kind used for stabilisation of the phase of the voltage produced by oscillator 1—4 by means of a control voltage, stabilisation, however, not occurring until a divergence occurring between the frequencies to be stabilised relative to one another is comprised within the catching range, often small, of the regulating circuit.

If the frequency divergence between the voltages to be stabilised relative to one another is such that the desired stabilisation does not occur, the catching range may be extended by supplying a search voltage produced by a search voltage generator to tube 5.

The search generator comprises a neon tube 12 which, in series with resistor 14 shunted by a condenser 13 is connected in parallel with a resistor 15 included in the anode circuit of the reactance tube which is shunted by a condenser 16. Also, the connecting point in the series combination of the neon tube 12 and the resistor 14 shunted by the condenser 13 is coupled to the control grid of the control tube 5 via the series combination of a condenser 18 and the resistor 19.

The device described operates as follows. When the oscillator voltage is stabilised, the direct control voltage set up at the control grid of the tube 5 is such that the anode current has a mean value at which the neon tube 12 is extinguished. Point 17 is then at a potential equal to that of the anode voltage source and the voltage drop across the neon tube is determined by the voltage drop across the anode resistance 15.

If in these circumstances the oscillator frequency diverges from the control voltage frequency so that the frequency to be corrected lies outside of the catching range of the control circuit with consequent failure of stabilisation, the current passing through the control tube 5 and hence the voltage drop across the anode resistor 15 increases to a value exceeding the ignition voltage of the neon tube, which then ignites. This causes a voltage drop to occur across the resistor 14 so that condenser 13 is charged rapidly. A sawtooth voltage is produced across the network 13—14 and is supplied to the control grid of the control tube 5 via the condenser 18 and the resistor 19. The control tube is then cut-off with the result that the current passing through the resistor 15 is decreased and the condenser 16 slowly discharges in accordance with the time constant of the filter 15—16, whereupon the neon tube is re-extinguished. After the condenser 13 has also become slowly discharged across the resistor 14, the neon tube is re-ignited, and the process described above is repeated until the first control voltage has stabilized the oscillator voltage and there is no longer sufficient voltage to ignite the neon tube 12.

Figure 2:
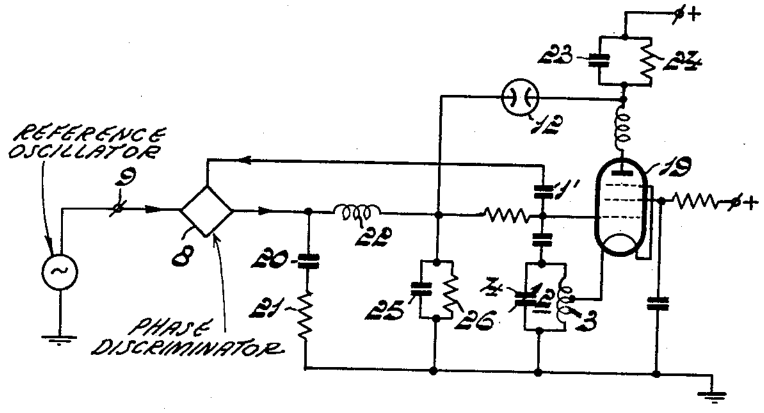
Fig. 2 shows a circuit arrangement of a device according to the invention, in which the oscillator and the control tube are united.

Fig. 2 shows a control circuit arrangement in which the oscillator and reactance tube are combined in tube 19. The frequency-determining circuit 2 includes a tuning condenser 4 and a coil 3. Circuit 2 is connected between the control grid of tube 19 and ground with a tap on coil 3 being connected to the cathode of tube 19. Oscillations developed in circuit 2 are supplied to phase discriminator 8 and mixed the second control voltage supplied from terminal 9 to produce a first control voltage of the type previously discussed. The first control voltage is supplied to the control grid of tube 19 through a low-pass filter including a series inductance 22 and a grounded input impedance including a condenser 20 in series with a resistor 21. The neon tube 12 is connected between that end of the anode resistance 24, shunted by a condenser 23, which is adjacent to the anode of the tube 19, and the control grid lead of the tube 19. The point connecting the neon tube 12 to the control grid lead is also grounded through a resistor 26 shunted by a condenser 25. The circuit arrangement shown in Fig. 2 is such that the neon tube 12, in contradistinction to that in the circuit arrangement shown in Fig. 1 is ignited at a minimum value of the anode current of the tube 19, with the result that the search voltage generator shown in Fig. 2 is particularly suitable for circuits requiring comparatively large tube currents.

The operation of the arrangement is substantially similar to that of the arrangement shown in Fig. 1. When the oscillator is stabilised, the voltage across the neon tube 12 is substantially equal to the anode voltage of the tube 19. When stabilization fails, low anode current ignites the neon tube 12. A sawtooth search voltage is set up at the anode resistor 24 with its shunting condenser 23 and is supplied to the control grid of the tube 19 for the purpose of extending the catching range of the circuit. If as a result of the searching operation, stabilisation is obtained, the discriminator 8 supplies a direct control voltage to the control grid such that the anode current of the oscillator assumes a mean value which is too high to ignite the neon tube.

In a practical construction of the circuit arrangement described without the use of the glow discharge tube generator, the catching range was 6 kcs/sec. The use of a search voltage generator comprising a neon tube of the type Philips 4018, with a holding range of 100 kcs/sec. resulted in an extension of the catching range up to 85 kcs/sec.

The circuit arrangement shown in Fig. 2 restricts the variation of the anode current permissible for proper stabilisation.

Figure 3:
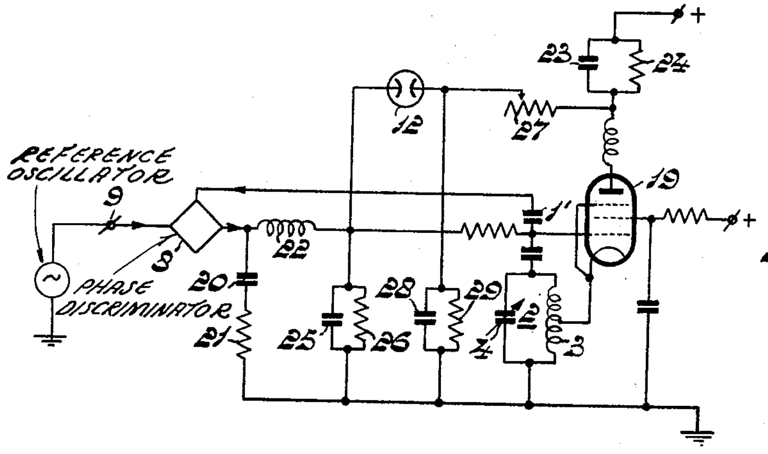
Fig. 3 shows a modification of the device shown in Fig. 2, which has several practical advantages.

If a high anode current variation is required, the circuit arrangement shown in Fig. 3, which shows a modification of the arrangement shown in Fig. 2, can be used with advantage. The circuit arrangement is substantially similar to the circuit arrangement shown in Fig. 2 except that the neon tube is now connected to the anode resistor of tube 19 through a variable resistor 27. In addition, the variable resistor 27, jointly with a resistor 29, which is connected to the adjustable contact of the resistor 27 and is shunted by a condenser 28, forms part of a potentiometer which shunts the tube 19. The extension of the catching range is now dependent to a greater extent on the extinguishing and igniting voltage tolerances of the neon tube used. However, this disadvantage can be substantially eliminated by "running-in" the neon tubes prior to their operation and by suitable adjustment of the resistance 27.

What I claim is:

1. A system for stabilizing a first voltage produced by a variable oscillator with respect to a second voltage produced by a reference oscillator comprising automatic stabilisation apparatus operative within a predetermined catching range for effecting said stabilisation, said apparatus including a phase discriminator for comparing said first voltage with said second voltage and producing therefrom a third voltage which is a direct voltage when the first and second voltages are in isochronism and is otherwise an alternating voltage, a reactance tube operatively coupled to said variable oscillator and provided with input and output electrodes, and means connecting said input electrode to the output of said discriminator, whereby the stabilisation is effected within said catching range, said reactance tube passing an excessive current when said first voltage falls outside said predetermined catching range; and a device for momentarily extending said predetermined catching range, said device including a search voltage generator coupled between the input and output electrodes of said reactance tube and provided with a gaseous discharge tube, said generator including means responsive to excessive current flow in said reactance tube by which pulsating voltages are produced solely when said first voltage falls outside of said predetermined catching range, and means to supply said pulsating voltages to said reactance tube input electrode, whereby the predetermined catching range is extended while said pulsating voltages are produced.

2. A system for stabilising a first voltage produced by a variable oscillator with respect to a second voltage produced by a reference oscillator comprising automatic stabilization apparatus operative within a predetermined catching range for effecting said stabilization, said apparatus including a phase discriminator for comparing said first voltage with said second voltage and producing therefrom a third voltage which is a direct voltage when the first and second voltages are in isochronism and is otherwise an alternating voltage, a reactance tube operatively coupled to said variable oscillator and provided with a control grid an anode and circuits therefor, and means connecting said control grid to the output of said discriminator, whereby the stabilisation is effected within said catching range, said reactance tube passing excessive anode current when said first voltage falls outside said predetermined catching range; and a device for momentarily extending said predetermined catching range, said device including a search voltage generator coupled between the control grid and anode circuits of said reactance tube and provided with a glow discharge tube, said generator including means responsive to excessive current flow in said reactance tube by which sawtooth voltages are produced solely when said first voltage falls outside of said predetermined catching range, and means to supply said sawtooth voltages to said reactance tube input electrode, whereby the predetermined catching range is extended while said pulsating voltages are produced.

3. A system as set forth in claim 2 further including a network comprising a resistance and a capacitance connected in parallel, said glow discharge tube having one terminal thereof connected to said network and the other terminal thereof coupled to said reactance tube anode circuit, and the junction of said network and said glow discharge tube being capacitively coupled to the control grid circuit of said reactance tube.

4. A system as set forth in claim 2 wherein a network having a resistance shunted by a capacitance is included in the anode circuit of said reactance tube and wherein one end of said glow tube is coupled to the end of said network adjacent to the anode of said reactance tube, the other end of said glow tube being coupled to the control grid of said reactance tube.

5. Apparatus as set forth in claim 4 wherein said reactance tube is shunted by a potentiometer including a variable resistance and wherein said glow tube is connected to said network through said variable resistance.

References Cited in the file of this patent

UNITED STATES PATENTS

| | | |
|---|---|---|
| 2,406,309 | Ziegler et al. | Aug. 20, 1946 |
| 2,457,140 | Frankel | Dec. 28, 1948 |